No. 683,132. Patented Sept. 24, 1901.
E. VON MARSÓVSZKY.
HORSESHOE.
(Application filed Sept. 14, 1900.)
(No Model.)

Witnesses.
A. E. Nelhuish
A. C. Mitchell

Inventor.
Emerich von Marsóvszky
per W. L. Haddan
Attorney

THE NORRIS PETERS CO., PHOTO-LITHO., WASHINGTON, D. C.

UNITED STATES PATENT OFFICE.

EMERICH VON MARSÓVSZKY, OF BUDAPEST, AUSTRIA-HUNGARY.

HORSESHOE.

SPECIFICATION forming part of Letters Patent No. 683,132, dated September 24, 1901.

Original application filed August 17, 1899, Serial No. 727,588. Divided and this application filed September 14, 1900. Serial No. 30,029. (No model.)

*To all whom it may concern:*

Be it known that I, EMERICH VON MARSÓVSZKY, a subject of the Emperor of Austria-Hungary, residing at Budapest, in the Empire of Austria-Hungary, have invented certain new and useful Improvements in Horseshoe Attachments, (being a division from my application, Serial No. 727,588, filed August 17, 1899,) of which the following is a specification.

The well-known disadvantages of the ordinary horseshoe fastened on the hoof by a number of nails have led to frequent attempts to design a horseshoe which can be easily taken off and exchanged. This is desired for many reasons, for mainly the nailing on of the horseshoe weakens the hoof very much and the horseshoe is worn out much quicker than the hoof grows, so that in nailing on new shoes the former holes have often to be used. Most of the diseases of the hoof result from such nailing, and it always requires the assistance of an expert farrier, which cannot be obtained in every case.

The object of the present invention is shown, for example, in one form of execution in the annexed drawings.

Figure 1:
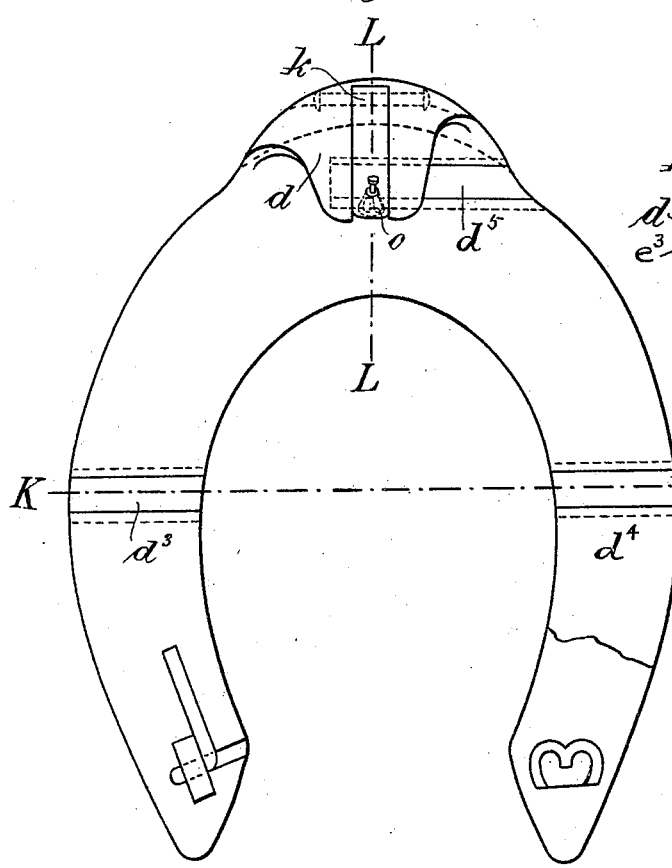
Figure 3:
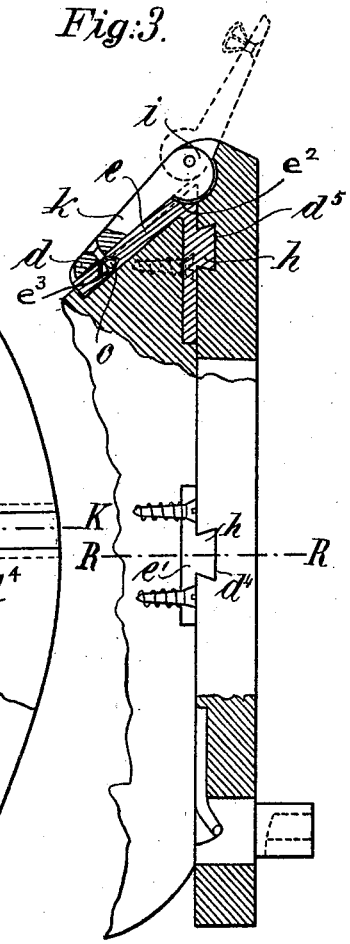
Figure 2:
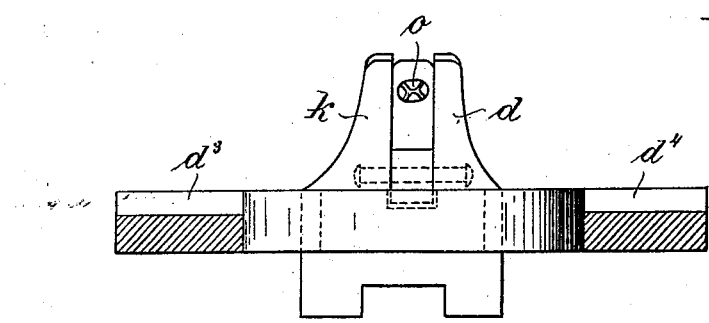
Figure 4:
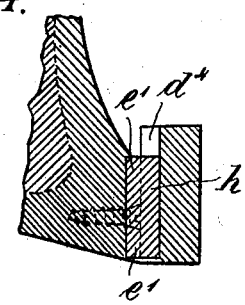

Figure 1 is a plan view of the horseshoe. Fig. 2 is a section on the line K K of Fig. 1. Fig. 3 is a section of the same and of part of the hoof and hoof-fittings on the line L L of Fig. 1. Fig. 4 is a section on the line R R of Fig. 3.

On the hoof there are first fastened three attachments $e\ e'\ e'$. Of these one (marked $e$) is fastened at the toe of the hoof and the other two, $e'\ e'$, are fastened, respectively, one at each side of the under face of the hoof, near the edge. These attachments $e\ e'\ e'$ are in the form of flat plates and have each a dovetail bar $h$ projecting beyond their under faces, the said bar being throughout its length prismatic and wider below than where it springs from the attachment-plate. The three bars $h$ are parallel to one another and lie in main direction transversely to the fore-and-aft axial line of the hoof. The attachment $e$, the plate of which is turned up over the toe, has a recess $e^2$ in its forward edge and a hole $e^3$ farther up the front, the purpose of which is hereinafter explained. The shoe A is provided with three parallel slots $d^3\ d^4\ d^5$, in cross-section similar to the respective bars $h$. These slots extend openly to the edges of the shoe, as shown more particularly in Fig. 1, in order that the shoe may be slid from the side with its grooves $d^3\ d^4\ d^5$ onto the hoof-attachment bars $h$, so as to engage therewith. In the front of the shoe A there projects upward a toe-cap $d$, the central part of which is formed by a pivoted lever $k$. The boss of the lever $k$ projects eccentrically from its pivot, as at $i$, in order that when the lever $k$ is brought from the dotted position of Fig. 3 into the position shown in full lines the projection $i$ takes into the recess $e^2$ of the attachment $e$ in front of the hoof, and thus prevents the horseshoe from slipping off laterally. The lever $k$ is provided with an elastic button $o$ like a spring glove-fastening button, which when pressed into the opening $e^3$ in front of the hoof attachment fixes itself frictionally therein.

I claim as my invention—

1. The combination with a plurality of separate attachments adapted to be fixed permanently to the hoof, of a horseshoe adapted to engage said attachments, said attachments and shoe having respectively dovetail bars and slots parallel to one another.

2. The combination with a plurality of separate attachments adapted to be fixed permanently to the hoof, of a horseshoe adapted to engage said attachments, said attachments and shoe having respectively dovetail bars and slots parallel to one another, and transverse to the fore-and-aft axial line of the hoof.

3. The combination with a plurality of separate attachments adapted to be fixed permanently to the hoof, of a horseshoe adapted to engage said attachments, said attachments and shoe having respectively dovetail bars and slots parallel to one another, and a locking-lever pivoted to said shoe and adapted to engage in a slot in one of said attachments for preventing accidental displacement of the shoe.

In witness whereof I have hereunto set my hand in presence of two witnesses.

EMERICH VON MARSÓVSZKY.

Witnesses:
FRANK DYER CHESTER,
LOUIS VANDORY.